(12) United States Patent
Cheng et al.

(10) Patent No.: US 11,042,497 B2
(45) Date of Patent: Jun. 22, 2021

(54) COMMUNICATION BETWEEN FIELD PROGRAMMABLE GATE ARRAYS

(71) Applicant: MICROSOFT TECHNOLOGY LICENSING, LLC, Redmond, WA (US)

(72) Inventors: Peng Cheng, Redmond, WA (US); Ran Shu, Redmond, WA (US); Guo Chen, Redmond, WA (US); Yongqiang Xiong, Redmond, WA (US); Jiansong Zhang, Redmond, WA (US); Ningyi Xu, Redmond, WA (US); Thomas Moscibroda, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/616,301

(22) PCT Filed: Apr. 25, 2018

(86) PCT No.: PCT/US2018/029240
§ 371 (c)(1),
(2) Date: Nov. 22, 2019

(87) PCT Pub. No.: WO2018/217378
PCT Pub. Date: Nov. 29, 2018

(65) Prior Publication Data
US 2020/0117630 A1    Apr. 16, 2020

(30) Foreign Application Priority Data

May 24, 2017    (CN) .......................... 201710375569.X

(51) Int. Cl.
*G06F 13/40*    (2006.01)
*H04L 12/725*    (2013.01)
(Continued)

(52) U.S. Cl.
CPC ........ *G06F 13/4022* (2013.01); *H04L 45/306* (2013.01); *H04L 45/74* (2013.01); *H04L 69/22* (2013.01); *G06F 2213/0026* (2013.01)

(58) Field of Classification Search
CPC combination set(s) only.
See application file for complete search history.

(56) References Cited

U.S. PATENT DOCUMENTS 7,359,388 B2 * 4/2008 Grass .................. H04L 12/6418
370/352
2007/0101242 A1    5/2007 Yancey et al.
(Continued)

FOREIGN PATENT DOCUMENTS

| CN | 101202707 A | 6/2008 |
| CN | 104133777 A | 11/2014 |
| CN | 104780019 A | 7/2015 |

OTHER PUBLICATIONS

International Search Report and Written Opinion for PCT/US2018/026240, dated Jul. 23, 2018.
(Continued)

*Primary Examiner* — Henry Tsai
(74) *Attorney, Agent, or Firm* — Merchant & Gould P.C.

(57) ABSTRACT

The implementations of the subject matter described herein relate to communication between field programmable gate arrays. In some implementations, an FPGA device comprises a first protocol stack configured to: receive, from a source application, a data transmitting request for a destination application; package the data transmitting request into a first packet by adding a header to the data transmitting request, the header indicating the source application and the destination application; and transmit a physical address of a second protocol stack connected with the destination application. The FPGA device further comprises a PCIe interface configured to: package the first packet into a second packet
(Continued)

based on the physical address of the second protocol stack received from the first protocol stack so that the first packet serves as a data portion of the second packet, the second packet being a TLP conforming to the PCIe standard; and transmit the second packet.

20 Claims, 4 Drawing Sheets

(51) Int. Cl.
*H04L 12/741* (2013.01)
*H04L 29/06* (2006.01)

(56) References Cited

U.S. PATENT DOCUMENTS

| | | |
|---|---|---|
| 2009/0228628 A1 | 9/2009 | Standfield |
| 2010/0157854 A1 | 6/2010 | Anderson et al. |
| 2014/0114887 A1* | 4/2014 | Iyer .................... G06F 13/4221 706/12 |
| 2014/0114928 A1* | 4/2014 | Beers ................. G06F 11/3604 707/687 |

OTHER PUBLICATIONS

"Office Action Issued in Chinese Patent Application No. 201710375569. X", dated Dec. 9, 2020, 8 Pages.

* cited by examiner

COMMUNICATION BETWEEN FIELD PROGRAMMABLE GATE ARRAYS

This application is a U.S. National Stage Application of PCT/US2018/029240, filed Apr. 25, 2018, which claims benefit of Chinese Patent Application No. 201710375569.X, filed May 24, 2017, which applications are incorporated herein by reference. To the extent appropriate, a claim of priority is made to each of the above disclosed applications.

BACKGROUND

In recent years, to meet the growing requirements for high performance and power efficiency, field programmable gate array (FPGA) devices are deployed at a massive scale in application scenarios such as datacenters. The large-scale distributed FPGA applications often require collaboration between a plurality of FPGA devices. For example, modern search ranking logic has been implemented using multiple FPGAs. Such type of multi-FPGA applications requires frequent data transmission between FPGAs.

SUMMARY

In some implementations, there is provided a field programmable gate array (FPGA) device, the FPGA device comprising a first protocol stack configured to: receive, from a source application, a data transmitting request for a destination application; package the data transmitting request into a first packet by adding a header to the data transmitting request, the header indicating the source application and the destination application; and transmit a physical address of a second protocol stack connected with the destination application. The FPGA device further comprises a Peripheral Component Interconnect Express (PCIe) interface configured to: package the first packet into a second packet based on the physical address of the second protocol stack received from the first protocol stack so that the first packet serves as a data portion of the second packet, the second packet being a Transaction Layer Packet (TLP) that conforms to the PCIe standard; and transmit the second packet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs are used to indicate the same or similar elements.

DETAILED DESCRIPTION

The subject matter described herein will be described in detail with reference to several example implementations. It should be understood that these implementations are discussed only for the purpose of enabling those skilled in the art to better understand and thus implementing the subject matter described herein, rather than suggesting any limitations on the scope of the subject matter described herein.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Figure 1:
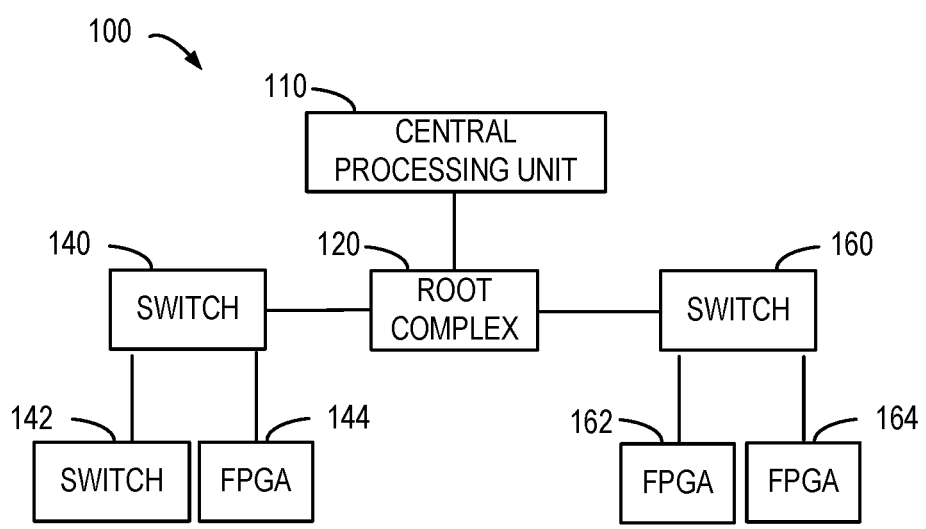
FIG. 1 schematically illustrates a block diagram of an environment in which a plurality of implementations of the subject matter described herein can be implemented.

Basic principles and several example implementations of the subject matter described herein will be described below with reference to the drawings. FIG. 1 illustrates a block diagram of an environment 100 in which a plurality of implementations of the subject matter described herein can be implemented. The environment 100 may be a computer system, such as a server. It is to be understood that the environment 100 shown in FIG. 1 is only example, rather than constituting any limitation to the function and scope of the implementations of the subject matter described herein.

As shown in FIG. 1, a central processing unit (CPU) 110 can be coupled with a root complex 120. In some implementations, the root complex 120 can also be integrated in the CPU 110. The root complex can be connected with one or more PCIe switches or FPGA devices via a Peripheral Component Interconnect Express (PCIe) interface. For example, as shown in FIG. 1, the root complex 120 is connected with the PCIe switches 140 and 160. The PCIe switch can be further connected to other PCIe switches or FPGA devices via the PCIe interface. The FPGA device can be an FPGA card or abbreviated as an FPGA. For instance, the PCIe switch 140 is connected with the PCIe switch 142 and the FPGA device 144, while the PCIe switch 160 is connected with the FPGA devices 162 and 164.

Figure 2:
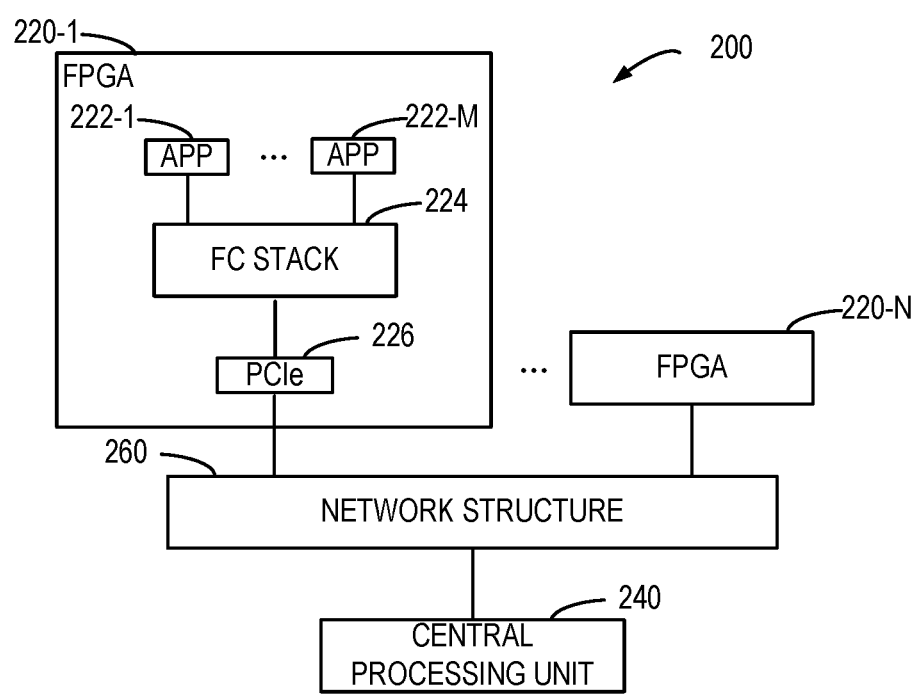
FIG. 2 illustrates an architecture diagram of communication between FPGA devices according to some implementations of the subject matter described herein.

FIG. 2 illustrates an architecture diagram 200 for communication between FPGA devices 220 according to some implementations of the subject matter described herein. The architecture diagram 200 can be implemented in a computing device, such as a server, including a plurality of FPGA devices 220-1 . . . 220-N in the same server (collectively referred to as FPGA device 220 for the sake of convenience). Principles of the subject matter described herein will be described in detail mainly with reference to FIG. 2. For the sake of clarity, FIG. 2 only illustrates the inner structure of the FPGA device 220-1. However, it is to be understood that other FPGA devices 220 can be implemented with the same inner structure.

As shown in FIG. 2, the FPGA device 220-1 can communicate with other FPGA devices 220 (for example, the FPGA device 220-N) via the network structure 260. For example, the network structure 260 can be implemented with the root complex and/or PCIe switch, as shown in FIG. 1. The FPGA devices 220-1 and 220-N can be any two of the FPGA devices 144, 162 and 164 as shown in FIG. 1. If all the FPGA devices 220 are connected to the root complex 120, the network structure 260 is the root complex; if all the FPGA devices 220 are connected to the same switch, the network structure 260 is the switch; if the FPGA devices 220 are connected to different switches, and the interconnection between these FPGA devices 220 is not via the root complex, the network structure 260 only includes the switches between these FPGA devices 220; if the FPGA devices 220 are connected to different switches, and the interconnection between these FPGA devices 220 is via the root complex, the network structure 260 only includes the switches and the root complex between these FPGA devices 220. For example, if the FPGA devices 220 are the FPGA devices 162 and 164 illustrated in FIG. 1, the network structure 260 may include the PCIe switch 160. If the FPGA devices 220 are the FPGA device 144 and 162 shown in FIG. 1, the network structure 260 may include the root complex 120 and the PCIe switches 140 and 160.

The FPGA devices 220 may include one or more applications 221-1, . . . , 222-M (collectively referred to application 220 for the sake of convenience). The application 222 can perform various processing tasks, such as search ranking and training of the neural network model. The FPGA device 220 may further include the PCIe interface 226 which is used to support communication between the FPGA devices. The PCIe standard includes three protocol layers, namely, the transaction layer, data link layer and physical layer, in which in the transaction layer, data is packaged into the Transaction Layer Packet (TLP), or the data is derived from the TLP. Data in the FPGA device 220-1 can be transmitted via the PCIe interface 226 to other PCIe devices, such as the FPGA device 220-N. However, communication from application to application is not well supported by the PCIe standard.

Currently, there are multiple manners for communication between a plurality of FPGA devices or a plurality of FPGA applications. However, these manners for communication generally involve the duplication operation of the memory. For example, data are written into a memory of an FPGA device and then read from the memory by another FPGA device. The latency caused by the reading and writing operations of the memory would cause the communication latency to increase significantly. Furthermore, if a plurality of communication connections are established at the same time, the FPGA device would encounter memory refreshing problems during operating the memory.

To realize direct communication between a plurality of FPGA applications in the same server via the PCIe interface, different communication connections should be differentiated. An intuitive scheme is to receive packets of each connection with a large number of physical addresses. However, this scheme requires massive physical address space.

According to some implementations, the FPGA device includes a protocol stack to support direct communication between applications of different FPGA devices. For example, as shown in FIG. 2, the FPGA device 220-1 includes the protocol stack 224. Similarly, other FPGA devices 220 (for example, the FPGA device 220-M) also include protocol stacks (not shown).

In addition, the computing device 200 may further include the central processing unit 240 which is used to manage various devices and modules in the computing device 200, and assign connection identifiers in response to the connection establishment request from the application 222 of the FPGA device 220. In some implementations, the central processing unit 240 can determine and coordinate resources in the computing device 200, and store identifiers (for example, including an ID of the FPGA device and an ID of the protocol stack) and corresponding physical addresses of the resources in the computing device 200. It is to be understood that although the central processing unit 240 is illustrated here, other general or dedicated management mechanisms (such as an FPGA device) can also be utilized to manage the resources. The subject matter described herein is not limited in this respect.

Figure 3:
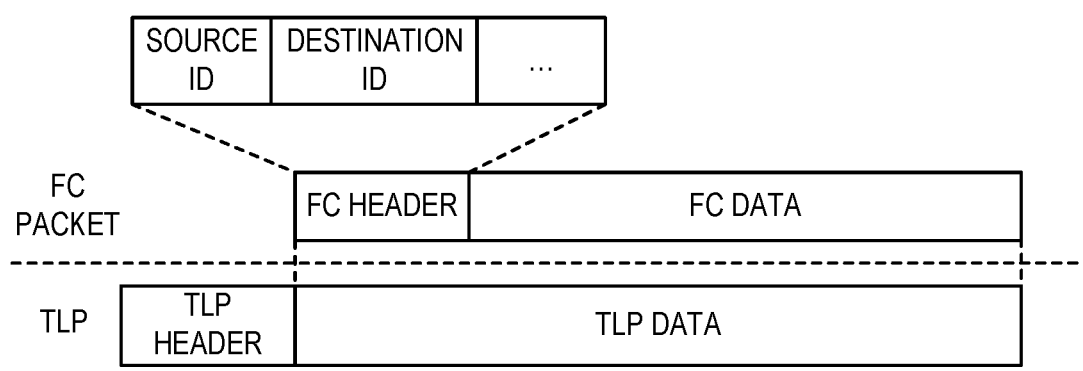
FIG. 3 illustrates a schematic diagram of a packet structure according to some implementations of the subject matter described herein.

FIG. 3 illustrates a structure of TLP of a transaction layer that conforms to the PCIe standard, in which the structure includes a TLP header and a TLP data portion. The TLP data portion can also be referred to as a data payload, and the TLP may include other additional fields. For the sake of simplicity, these additional fields are not shown in FIG. 3. Since the implementations of the subject matter described herein are only operated in the transaction layer of the PCIe standard, for the sake of simplicity, the data link layer and physical layer of the PCIe standard are not shown in FIG. 3.

According to some implementations, to differentiate different connections, an FPGA connect (FC) header can be added into the data portion of the TLP. As shown in FIG. 3, the TLP data portion forms FC packet, including the FC header and FC data. The FC header includes a source ID and a destination ID which identify the source application that the FC data comes from and the destination application that the FC data is to be transmitted to, respectively. In some implementations, the source ID may include the ID of the source FPGA device and the ID of the source application, and the destination ID may include the ID of the destination FPGA device and the ID of the destination application.

In some implementations, a plurality of connections can be established between an application 222 in the FPGA device 220-1 and an application in the other FPGA device 220-M. To differentiate these connections, the FC header may further include a port indicating a connection between the source application and the destination application, such as the source connection port and the destination connection port. Before the source application 222 establishes a connection with the destination application, the source connection port and the destination connection port in the connection establishment request message transmitted from the application 222 are unknown, and thus the corresponding positions can be configured as predetermined values (such as all zeros).

For example, the application 222 in the FPGA device 220-1 can transmit a data transmitting request to the destination application in the other FPGA device 220-N. The protocol stack 224 can package the FC packets based on the data transmitting request. For example, the protocol stack 224 determines the FC header based on the data transmitting request and adds the FC header to the data transmitting request, to package the data transmitting request into an FC packet and transmit the FC packet to the PCIe interface 226. As shown in FIG. 3, the FC header includes a source ID and a destination ID indicating the source application and destination application, respectively. In some implementations, the source ID and destination ID may further include a source connection port and a destination connection port.

After the PCIe interface 226 receives the FC packet, the FC packet is packaged into the TLP. Then, the TLP is processed and transmitted according to the PCIe standard. Since the PCIe standard needs to use the physical address, during the process of packaging the TLP, the physical address of the protocol stack connected with the destination application can be packaged in the TLP. As stated above, the physical address of the protocol stack can be managed by the central processing unit 240. Therefore, the physical address of the protocol stack connected with the destination application at the destination FPGA device is received from the central processing unit 240 via the protocol stack 224. Alternatively, the physical address of the protocol stack connected with the destination application at the destination FPGA device can also be managed by the protocol stack 224 directly. Similarly, during the process of packaging the TLP, the physical address of the source FPGA device 220 where the source application 222 resides can also be packaged in the TLP.

To minimize utilization of the physical address space, for each FPGA device, it is also possible to only use a physical address with the size of a packet as the receiving address of the protocol stack. The size of the packet can represent the size of the FC packet, or the size of data payload of the TLP. For example, when the FPGA device 220 receives the TLP, the transaction layer of the PCIe interface 226 can forwards the TLP to the protocol stack 224. Specifically, the PCIe interface 226 can only forward the data portion of the TLP to the receiving address of the protocol stack 224. For example, the PCIe interface 226 can forward a copy of the data portion of each received TLP to the receiving address of the protocol stack 224. The protocol stack 224 receives these data portions in turn and determines if these data portions are FC packets. For instance, some data portions of the TLPs do not include the FC header shown in FIG. 3, then the protocol stack 224 determines that these data portions are not FC packets, and not to be applied to the application 222 managed by the protocol stack 224. In this case, the protocol stack 224 can discard these data portions without further processing. When it is determined that these data portions include the FC headers, the protocol stack 224 can differentiate the FC packets by the FC header and transmit the FC data to the corresponding destination application. In this manner, the physical address space is saved significantly. As stated above, the FC header may include a connection identifier. Hence, the protocol stack 224 does not only transmit the FC packet to the corresponding application but also to the corresponding connection.

In some implementations, the source application 222 can transmit a connection establishment request from the source application to the destination application via a particular path (not shown) to the central processing unit 240. The central processing unit 240 can assign a port for the connection, including a source connection port and a destination connection port. Then, the central processing unit 240 communicates with the destination application to inform the destination application of the port of the connection and inquiry the destination application whether to establish the connection. If the destination application determines that the connection can be accepted, then the destination application informs the central processing unit 240 of the determination. The central processing unit 240 transmits to the source application 222 a response for the connection establishment request including the assigned port. As stated above, the port may include the source connection port and the destination connection port. After the connection is established, the source application 222 can communicate with the destination application via the protocol stack to transmit information. During the connection establishing process, the protocol stack 224 can receive the physical address of the protocol stack connected with the destination application from a processing device, such as the central processing unit 240, and manage the physical address.

In some implementations, the source application 222 can transmit a connection disconnection request for a connection from the source application to the destination application via a particular path (not shown) to the central processing unit 240. The connection disconnection request includes a source connection port and a destination connection port. The central processing unit 240 can release the source connection port and destination connection port assigned for the connection, and notify the source application 222 and the destination application to disconnect the connection.

Figure 4:
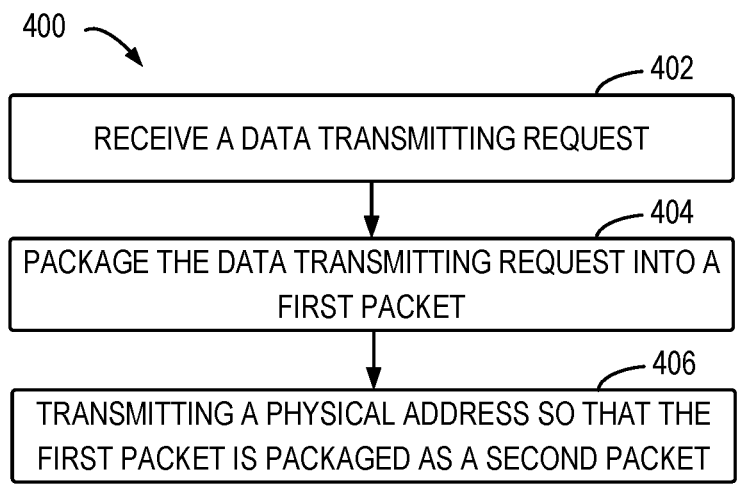
FIG. 4 illustrates a flowchart of a communication method according to some implementations of the subject matter described herein.

FIG. 4 illustrates a flowchart of a communication method 400 according to some implementations of the subject matter described herein. For the sake of clarity, the method 400 is described with reference to FIG. 2. However, it is to be understood that the method 400 can also be applied to any other appropriate devices and architectures.

At 402, the protocol stack 224 receives, from the source application 222, a data connection request for the destination application. At 404, the protocol stack 224 packages the data into the first packet by adding a header to the data connection request. The header indicates the source application 222 and the destination application. The destination application can be an application in the FPGA device 220-N.

At 406, the protocol stack 224 transmits the physical address of the protocol stack connected with the destination application so that the first packet is packaged into the second package. During the packaging process, the first packet serves as the data portion of the second packet. The second packet is the Transaction Layer Packet (TLP) that conforms to the Peripheral Component Interconnect Express (PCIe) standard. The packaging process can be implemented by the PCIe interface 226. Then the PCIe 226 can transmit the second packet to the physical address.

As stated above, the protocol stack 224 can receive the physical address of the protocol stack connected with the destination application from a processing device, such as the central processing unit 240, and manage the physical address.

Figure 5:
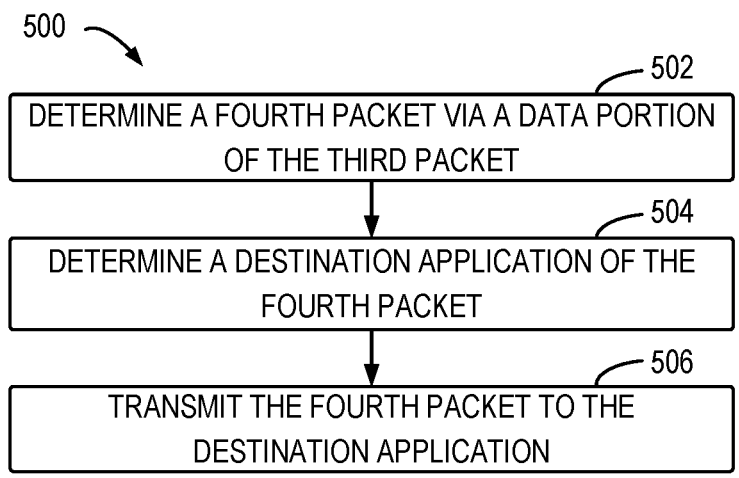
FIG. 5 illustrates a flowchart of a communication method according to some implementations of the subject matter described herein.

FIG. 5 illustrates a flowchart of a communication method 500 according to some implementations of the subject matter described herein. For the sake of clarity, the method 500 is described with reference to FIG. 2. However, it is to be understood that the method 500 can also applied to any other appropriate devices and architectures.

At 502, in response to receiving a third packet as the TLP, the PCIe interface 226 determines a fourth packet via the data portion of the third packet. The fourth packet can be the FC packet shown in FIG. 3.

At 504, the protocol stack 224 determines the destination application of the fourth packet based on the header of the fourth packet. At 506, the protocol packet 224 transmits the fourth packet to the destination application for the destination application to process the data.

Program codes for carrying out the methods of the subject matter described herein may be written in any combination of one or more programming languages, such as Verilog or C language. These program codes may be provided to a processor or a controller of a general purpose computer, a special purpose computer, or other programmable data processing apparatus, such that the program codes, when executed by the processor or the controller, cause the functions/operations specified in the flowcharts and/or block diagrams to be implemented. The program codes may be executed entirely on a machine, partly on the machine, as a stand-alone software package, partly on the machine and partly on a remote machine or entirely on the remote machine or server.

In the context of the subject matter disclosed herein, a machine readable medium may be any tangible medium that can contain, or store a program for use by or in connection with an instruction execution system, apparatus, or device.

The machine readable medium may be a machine readable signal medium or a machine readable storage medium. The machine readable medium may include but is not limited to an electronic, magnetic, optical, electromagnetic, infrared, or semiconductor system, apparatus, or device, or any suitable combination thereof. More specific examples of the machine readable storage medium includes an electrical connection via one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Further, although the operations are depicted in a particular order, it should not be understood as requiring such operations to be performed in the particular order shown or in sequential order. In certain circumstances, multitasking and parallel processing may be advantageous. Likewise, while several specific implementation details are contained in the above discussions, they should not be construed as limitations on the scope of subject matter described herein. Certain features that are described in the context of separate implementations can also be implemented in combination in a single implementation. Conversely, various features that are described in the context of a single implementation can also be implemented in multiple implementations separately or in any suitable sub-combination.

Some example implementations of the subject matter described herein are listed below.

According to some implementations, there is provided a communication method implemented at a field programmable gate array (FPGA), comprising: receiving, by a first protocol stack from a source application, a data transmitting request for a destination application; packaging, by the first protocol stack, the data transmitting request into a first packet by adding a header to the data transmitting request, the header indicating the source application and the destination application; and transmitting, by the first protocol stack, a physical address of a second protocol stack connected with the destination application so that the first packet is packaged as a second packet and the first packet serves as a data portion of the second packet, the second packet being a Transaction Layer Packet (TLP) that conforms to the Peripheral Component Interconnect Express (PCIe) standard.

In some implementations, the header further includes a port indicating a connection between the source application and the destination application.

In some implementations, the communication method further comprises: in response to receiving a third packet as the TLP, determining a fourth packet via a data portion of the third packet; determining, based on a header of the fourth packet, a destination application of the fourth packet; and transmitting the fourth packet to the destination application.

In some implementations, the communication method further comprises: transmitting, to a processing device, a connection establishment request from the source application, the connection establishment request indicating the source application and the destination application; and receiving, from the processing device, a response for the connection establishment request, the response including the port assigned for the connection between the source application and the destination application.

In some implementations, the communication method further comprises: transmitting, to a processing device, a connection disconnection request from the source application to disconnect the connection between the source application and the destination application and release the port indicating the connection between the source application and the destination application, the connection disconnection request indicating the source application and the destination application and including the port.

In some implementations, the communication method further comprises: receiving, from a processing device, the physical address of the second protocol stack.

According to some implementations, there is provided a field programmable gate array (FPGA) device, the FPGA device comprising: a first protocol stack configured to: receive, from a source application, a data transmitting request for a destination application; package the data transmitting request into a first packet by adding a header to the data transmitting request, the header indicating the source application and the destination application; and transmit a physical address of a second protocol stack connected with the destination application; a Peripheral Component Interconnect Express (PCIe) interface configured to: package the first packet into a second packet based on the physical address of the second protocol stack received from the first protocol stack so that the first packet serves as a data portion of the second packet, the second packet being a Transaction Layer Packet (TLP) that conforms to the PCIe standard; and transmit the second packet.

In some implementations, the header further includes a port indicating a connection between the source application and the destination application.

In some implementations, the PCIe interface is further configured to, in response to receiving a third packet as the TLP, determine a fourth packet via a data portion of the third packet; and wherein the first protocol stack is configured to: determine, based on a header of the fourth packet, a destination application of the fourth packet; and transmit the fourth packet to the destination application.

In some implementations, the second protocol stack is assigned with a physical address of a size of the first packet.

In some implementations, FPGA device further comprises the source application, the source application being configured to: transmit a connection establishment request to a processing device, the connection establishment request indicating the source application and the destination application; and receiving, from the processing device, a response for the connection establishment request, the response including the port assigned for the connection between the source application and the destination application.

In some implementations, FPGA device further comprises the source application, the source application being configured to: transmit a connection disconnection request to a processing device to disconnect the connection between the source application and the destination application and release the port indicating the connection between the source application and the destination application, the connection disconnection request indicating the source application and the destination application and including the port.

In some implementations, the first protocol stack is further configured to: receive, from a processing device, the physical address of the second protocol stack.

According to some implementations, there is provided a computing system comprising: a first field programmable gate array (FPGA) device, including: a first protocol stack configured to: receive, from a source application, a data transmitting request for a destination application; package the data transmitting request into a first packet by adding a header to the data transmitting request, the header indicating the source application and the destination application; and transmit a physical address of a second protocol stack connected with the destination application; a Peripheral Component Interconnect Express (PCIe) interface configured to: package the first packet into a second packet based on the physical address of the second protocol stack so that the first packet serves as a data portion of the second packet, the second packet being a Transaction Layer Packet (TLP) that conforms to the PCIe standard; and transmit the second packet; and a second FPGA device, including: a PCIe interface configured to: in response to receiving the second packet, determine the first packet via the data portion of the second packet; and the second protocol stack configured to: determine, based on the header of the first packet, the destination application of the first packet; and transmit the first packet to the destination application.

In some implementations, the header further includes a port indicating a connection between the source application and the destination application.

In some implementations, the first protocol stack is further configured to: receive, from a processing device, the physical address of the second protocol stack.

In some implementations, each of the first protocol stack and the second protocol stack is assigned with a physical address of a size of the first packet.

In some implementations, the computing system further comprises: a network structure for connecting the first FPGA device and the second FPGA device, wherein the network structure includes at least one of a root complex and a switch.

In some implementations, the first FPGA device includes the source application, the source application being configured to: transmit, to a processing device, a connection establishment request from the source application, the connection establishment request indicating the source application and the destination application; and receiving, from the processing device, a response for the connection establishment request, the response including the port assigned for the connection between the source application and the destination application.

In some implementations, the first FPGA device includes the source application, and the source application is configured to: transmit, to a processing device, a connection disconnection request to disconnect the connection between the source application and the destination application and release the port indicating the connection between the source application and the destination application, the connection disconnection request indicating the source application and the destination application and including the port.

Although the subject matter has been described with languages specific to structural characteristics and/or method logic acts, it should be appreciated that the subject matter defined by the attached claims is not limited to the above described particular characteristics and acts. Conversely, the above described particular characteristics and acts are only example forms for realizing the claims.

The invention claimed is:

1. A communication method implemented at a field programmable gate array (FPGA), comprising:
   receiving, by a first protocol stack from a source application, a data transmitting request for a destination application, the data transmitting request including a data portion;
   packaging, by the first protocol stack, the data transmitting request into a first packet by adding a header to the data transmitting request, the header indicating the source application ID and the destination application ID;
   transmitting, by the first protocol stack, a physical address of a second protocol stack connected with the destination application so that the first packet is packaged as a second packet, and the first packet serves as a data portion of the second packet, the second packet being a Transaction Layer Packet (TLP) that conforms to the Peripheral Component Interconnect Express (PCIe) standard; and
   transmitting the data portion of the data transmitting request to the destination application based on the destination application ID in the second packet.

2. The communication method according to claim 1, wherein the header further includes a port indicating a connection between the source application and the destination application.

3. The communication method according to claim 1, further comprising:
   in response to receiving a third packet as the TLP, determining a fourth packet via a data portion of the third packet;
   determining, based on a header of the fourth packet, a destination application of the fourth packet; and
   transmitting the fourth packet to the destination application.

4. The communication method according to claim 2, further comprising:
   transmitting, to a processing device, a connection establishment request from the source application, the connection establishment request indicating the source application and the destination application; and
   receiving, from the processing device, a response for the connection establishment request, the response including the port assigned for the connection between the source application and the destination application.

5. The communication method according to claim 2, further comprising:
   transmitting, to a processing device, a connection disconnection request from the source application to disconnect the connection between the source application and the destination application and release the port indicating the connection between the source application and the destination application, the connection disconnection request indicating the source application and the destination application and including the port.

6. The communication method according to claim 1, further comprising:
   receiving, from a processing device, the physical address of the second protocol stack.

7. A field programmable gate array (FPGA) device, comprising:
   a first protocol stack configured to:
     receive, from a source application, a data transmitting request for a destination application;
     package the data transmitting request into a first packet by adding a header to the data transmitting request, the header indicating the source application ID and the destination application ID; and
     transmit a physical address of a second protocol stack connected with the destination application; and
   a Peripheral Component Interconnect Express (PCIe) interface configured to:
     package the first packet into a second packet based on the physical address of the second protocol stack received from the first protocol stack so that the first packet serves as a data portion of the second packet, the second packet being a Transaction Layer Packet (TLP) that conforms to the PCIe standard; and
     transmit the second packet.

8. The FPGA device according to claim 7, wherein the header further includes a port indicating a connection between the source application and the destination application.

9. The FPGA device according to claim 7,
wherein the PCIe interface is further configured to, in response to receiving a third packet as the TLP, determine a fourth packet via a data portion of the third packet; and
wherein the first protocol stack is configured to, based on a header of the fourth packet, determine a destination application of the fourth packet; and
transmit the fourth packet to the destination application.

10. The FPGA device according to claim 7, wherein the second protocol stack is assigned with a physical address of a size of the first packet.

11. The FPGA device according to claim 8, wherein the FPGA device further comprises the source application, the source application being configured to:
transmit a connection establishment request to a processing device, the connection establishment request indicating the source application and the destination application; and
receiving, from the processing device, a response for the connection establishment request, the response including the port assigned for the connection between the source application and the destination application.

12. The FPGA device according to claim 8, wherein the FPGA device further comprises the source application, the source application being configured to:
transmit a connection disconnection request to a processing device to disconnect the connection between the source application and the destination application and release the port indicating the connection between the source application and the destination application, the connection disconnection request indicating the source application and the destination application and including the port.

13. The FPGA device according to claim 7, wherein the first protocol stack is further configured to:
receive, from a processing device, the physical address of the second protocol stack.

14. A computing system, comprising:
a first field programmable gate array (FPGA) device, including:
a first protocol stack configured to:
receive, from a source application, a data transmitting request for a destination application;
package the data transmitting request into a first packet by adding a header to the data transmitting request, the header indicating the source application ID and the destination application ID; and
transmit a physical address of a second protocol stack connected with the destination application;
a Peripheral Component Interconnect Express (PCIe) interface configured to:
package the first packet into a second packet based on the physical address of the second protocol stack so that the first packet serves as a data portion of the second packet, the second packet being a Transaction Layer Packet (TLP) that conforms to the PCIe standard; and
transmit the second packet; and
a second FPGA device, including:
a PCIe interface configured to:
in response to receiving the second packet, determine the first packet via the data portion of the second packet; and
the second protocol stack configured to:
determine, based on the header of the first packet, the destination application of the first packet; and
transmit the first packet to the destination application.

15. The computing system according to claim 14, wherein the header further includes a port indicating a connection between the source application and the destination application.

16. The computing system according to claim 15, wherein the source application is configured to:
transmit, to a processing device, a connection establishment request from the source application, the connection establishment request indicating the source application and the destination application; and
receive, from the processing device, a response for the connection establishment request, the response including the port assigned for the connection between the source application and the destination application.

17. The computing system according to claim 15, wherein the source application is configured to:
transmit, to a processing device, a connection disconnection request from the source application to disconnect the connection between the source application and the destination application and release the port indicating the connection between the source application and the destination application, the connection disconnection request indicating the source application and the destination application and including the port.

18. The communication method according to claim 1, wherein the protocol stack receives, from the source application, a data connection request for the destination application.

19. The FPGA device according to claim 7, wherein the protocol stack receives, from the source application, a data connection request for the destination application.

20. The computing system according to claim 14, wherein the protocol stack receives, from the source application, a data connection request for the destination application.

* * * * *